US011017558B2

(12) United States Patent
Noble et al.

(10) Patent No.: US 11,017,558 B2
(45) Date of Patent: May 25, 2021

(54) CAMERA REGISTRATION IN A MULTI-CAMERA SYSTEM

(71) Applicant: SEEING MACHINES LIMITED, Fyshwick (AU)

(72) Inventors: John Noble, Braddon (AU); Timothy James Henry Edwards, Kallista (AU)

(73) Assignee: SEEING MACHINES LIMITED, Fyshwick (AU)

( * ) Notice: Subject to any disclaimer, the term of this patent is extended or adjusted under 35 U.S.C. 154(b) by 74 days.

(21) Appl. No.: 16/313,317

(22) PCT Filed: Jun. 29, 2017

(86) PCT No.: PCT/AU2017/050669
§ 371 (c)(1),
(2) Date: Dec. 26, 2018

(87) PCT Pub. No.: WO2018/000039
PCT Pub. Date: Jan. 4, 2018

(65) Prior Publication Data
US 2019/0164310 A1 May 30, 2019

(30) Foreign Application Priority Data

Jun. 29, 2016 (AU) .................. 2016902544

(51) Int. Cl.
*G06K 9/00* (2006.01)
*G06T 7/73* (2017.01)
(Continued)

(52) U.S. Cl.
CPC .............. *G06T 7/74* (2017.01); *B60R 21/00* (2013.01); *G03B 17/56* (2013.01);
(Continued)

(58) Field of Classification Search
CPC .... G06T 7/74; G06T 7/80; G06T 7/70; G06T 7/73; G03B 17/56; B60R 21/00; G06K 9/00832
See application file for complete search history.

(56) References Cited

U.S. PATENT DOCUMENTS

| 6,766,036 B1 * | 7/2004 | Pryor | A63F 13/06 382/103 |
| 2002/0082756 A1 * | 6/2002 | Breed | B60R 21/01536 701/45 |

(Continued)

FOREIGN PATENT DOCUMENTS

WO     2014152254     9/2014

OTHER PUBLICATIONS

Carnegie Robotics LLC (WO 2014/152254), Methods, Systems, and Apparatus for Multi-Sensory Stereo Vision for Robotics (Year: 2014).*

*Primary Examiner* — Solomon G Bezuayehu
(74) *Attorney, Agent, or Firm* — Jason P. Mueller; FisherBroyles, LLP

(57) ABSTRACT

Described herein is a method of registering a position and an orientation of one or more cameras in a camera imaging system. The method includes: receiving, from a depth imaging device, data indicative of a three dimensional image of the scene. The three dimensional image is calibrated with a reference frame relative to the scene. The reference frame includes a reference position and reference orientation. A three dimensional position of each of the cameras within the (Continued)

three dimensional image is determined relative to the reference frame. An orientation of each camera is determined to relative to the reference frame. The position and orientation of each camera is combined to determine a camera pose relative to the reference frame.

19 Claims, 6 Drawing Sheets

(51) Int. Cl.
    *G06T 7/80*     (2017.01)
    *G06T 7/70*     (2017.01)
    *B60R 21/00*     (2006.01)
    *G03B 17/56*     (2021.01)
    *G06K 9/32*     (2006.01)
    *G01S 17/89*     (2020.01)

(52) U.S. Cl.
    CPC ....... *G06K 9/00832* (2013.01); *G06K 9/3241* (2013.01); *G06T 7/70* (2017.01); *G06T 7/73* (2017.01); *G06T 7/80* (2017.01); *G01S 17/89* (2013.01); *G06T 2207/10028* (2013.01); *G06T 2207/30244* (2013.01); *G06T 2207/30268* (2013.01)

(56) References Cited

U.S. PATENT DOCUMENTS

| | | | |
|---|---|---|---|
| 2007/0127811 A1* | 6/2007 | Luo | G06K 9/6255 382/159 |
| 2008/0095404 A1* | 4/2008 | Abercrombie | G06T 7/62 382/104 |
| 2008/0273194 A1* | 11/2008 | De Sloovere | G01B 11/2755 356/139.09 |
| 2009/0261979 A1 | 10/2009 | Breed et al. | |
| 2011/0082613 A1* | 4/2011 | Oetiker | B62D 15/0285 701/25 |
| 2015/0009329 A1 | 1/2015 | Ishimoto | |
| 2015/0375612 A1* | 12/2015 | Welschoff | B60K 6/46 180/242 |
| 2016/0343166 A1* | 11/2016 | Inoko | G06T 7/73 |
| 2017/0261599 A1* | 9/2017 | Zeng | G01S 7/4026 |
| 2017/0278252 A1* | 9/2017 | Kaufmann | G06T 7/11 |
| 2017/0334357 A1* | 11/2017 | Lewis | G06T 7/11 |
| 2018/0215233 A1* | 8/2018 | Neveu | B60H 1/00742 |
| 2018/0365888 A1* | 12/2018 | Satzoda | G06K 9/00791 |
| 2019/0005464 A1* | 1/2019 | Harris, III | G06Q 10/20 |

\* cited by examiner

CAMERA REGISTRATION IN A MULTI-CAMERA SYSTEM

This application is a National Stage Entry under 35 U.S.C. 371 of PCT Patent Application No. PCT/AU2017/050669, filed Jun. 29, 2017, which claims priority to Australian Patent Application No. 2016902544, filed Jun. 29, 2016, the entire contents of which are incorporated herein by reference.

FIELD

The present disclosure relates to camera monitoring systems and in particular to a method and system for registering the position and orientation of cameras in a camera monitoring system. Embodiments of the disclosure have been particularly developed for multi-camera driver monitoring systems in vehicles. While some embodiments will be described herein with particular reference to that application, it will be appreciated that the disclosure is not limited to such a field of use, and is applicable in broader contexts.

BACKGROUND

Any discussion of the background art throughout the specification should in no way be considered as an admission that such art is widely known or forms part of common general knowledge in the field.

In monitoring and surveillance systems, it is often necessary to monitor a scene from different perspectives. This is typically achieved by positioning multiple cameras at different positions and orientations throughout the scene. In some applications, such as vehicle and driver monitoring systems, it is advantageous to be able to track and map the positions of objects from the field of view of one camera to another. In these applications, it is necessary to know the relative positions and orientations of each camera so that an accurate mapping or projection of the object position between each camera view can be performed.

Conventionally, the position and orientation of each camera is input manually by a technician during a calibration stage of installation of the monitoring system. This necessarily requires significant time and effort and the accuracy of the positions/orientations are limited by the technician's competence. Furthermore, each time a camera is to be repositioned or a new camera added to the monitoring system, the calibration procedure must be performed again at the cost of system downtime and technician's charges.

SUMMARY

In accordance with a first embodiment of the present disclosure there is provided a method of registering the position and orientation of one or more cameras in a camera imaging system, the method including:

a) receiving, from a depth imaging device, data indicative of a three dimensional image of the scene;

b) calibrating the three dimensional image with a reference frame relative to the scene, the reference frame including a reference position and reference orientation;

c) determining a three dimensional position of each of the cameras within the three dimensional image in the reference frame;

d) determining an orientation of each camera in at least one dimension in the reference frame; and e) combining the position and orientation for each camera to determine a camera pose in the reference frame.

In some embodiments, stage d) includes obtaining orientation data from orientation sensors mounted to the one or more cameras. In one embodiment, each orientation sensor includes an accelerometer. In one embodiment, each orientation sensor includes a gyroscope. In one embodiment, each orientation sensor includes a magnetometer. In one embodiment, each orientation sensor includes an inertial measurement unit.

In some embodiments, the depth imaging device includes one or more of a time of flight camera, structured light 3D scanner, stereo camera system, depth camera, laser scanner or LiDAR system.

The scene preferably includes a vehicle cabin or cockpit. Preferably, the scene is a vehicle and the reference orientation is defined relative to a vehicle axle or a vehicle drive shaft.

In some embodiments, the method includes the stage of receiving velocity or acceleration data of the scene. In some embodiments, the method includes the stage of receiving GPS data for a predefined position within the scene.

In some embodiments, the stage of determining the three dimensional position of the cameras within the scene includes performing shape recognition on the three dimensional image to automatically recognize the position of the cameras in the image. In one embodiment, the shape recognition is configured to recognize the shape of the cameras. In another embodiment, the shape recognition is configured to recognize predefined patterns disposed on or adjacent each camera.

In some embodiments, the stage of identifying the three dimensional position of the cameras within the scene includes manually designating the camera positions in the three dimensional image using a software application.

In one embodiment, the reference position is the position of one of the cameras. In another embodiment, the reference position is the position of a known feature within the scene.

In some embodiments, the stage of determining a three dimensional position of each of the cameras within the scene includes calibrating the scene geometry with a known reference feature.

In one embodiment, the method includes the stage:

f) removing the depth imaging device from the scene.

In some embodiments, stage b) includes:

i. loading reference data indicative of the vehicle scene, the reference data including positions and orientations of one or more known features within the vehicle scene;

ii. identifying, within the three dimensional image, the geometric appearance of one or more of the known features;

iii. determining, from the geometric appearance, the three dimensional position and orientation of the camera relative to the known features identified in stage c) and calculating a pose of the three dimensional camera within the vehicle scene.

In accordance with another embodiment of the present disclosure, there is provided a system for registering the position and orientation of one or more cameras in a camera imaging system, each of the cameras being mounted within a scene, the system including:
- a depth imaging device for obtaining data indicative of a three dimensional image of the scene; and
- a processing unit configured to:
  - calibrating the three dimensional image with a reference frame relative to the scene, the reference frame including a reference position and reference orientation;
  - determining a three dimensional position of each of the cameras within the three dimensional image in the reference frame;
  - determining an orientation of each camera in at least one dimension in the reference frame; and
  - combining the position and orientation for each camera to determine a camera pose in the reference frame.

In some embodiments, the system includes one or more orientation sensors, each being mounted to an associated camera and configured for measuring orientation data indicative of the orientation of the associated camera in at least one dimension.

BRIEF DESCRIPTION OF THE DRAWINGS

Disclosed embodiments of the disclosure are described below, by way of example only, with reference to the accompanying drawings in which.

DETAILED DESCRIPTION

System Overview

The embodiments of the present disclosure described herein relate to automating the registration of positions and orientations of cameras in a multi-camera vehicle monitoring system. In these embodiments, the scene to be imaged includes a driver of a vehicle, the interior of the vehicle/cockpit, the forward road scene of the vehicle and optionally side and rear views from the vehicle. The vehicle may represent a commercial automobile, truck, earthmoving machine, airplane, jet, helicopter or equivalent simulation environment. However, it will be appreciated that the disclosure is applicable to other multi-camera monitoring systems such as surveillance networks for monitoring other scenes. The disclosure may also be applicable to single camera monitoring systems.

Figure 1:
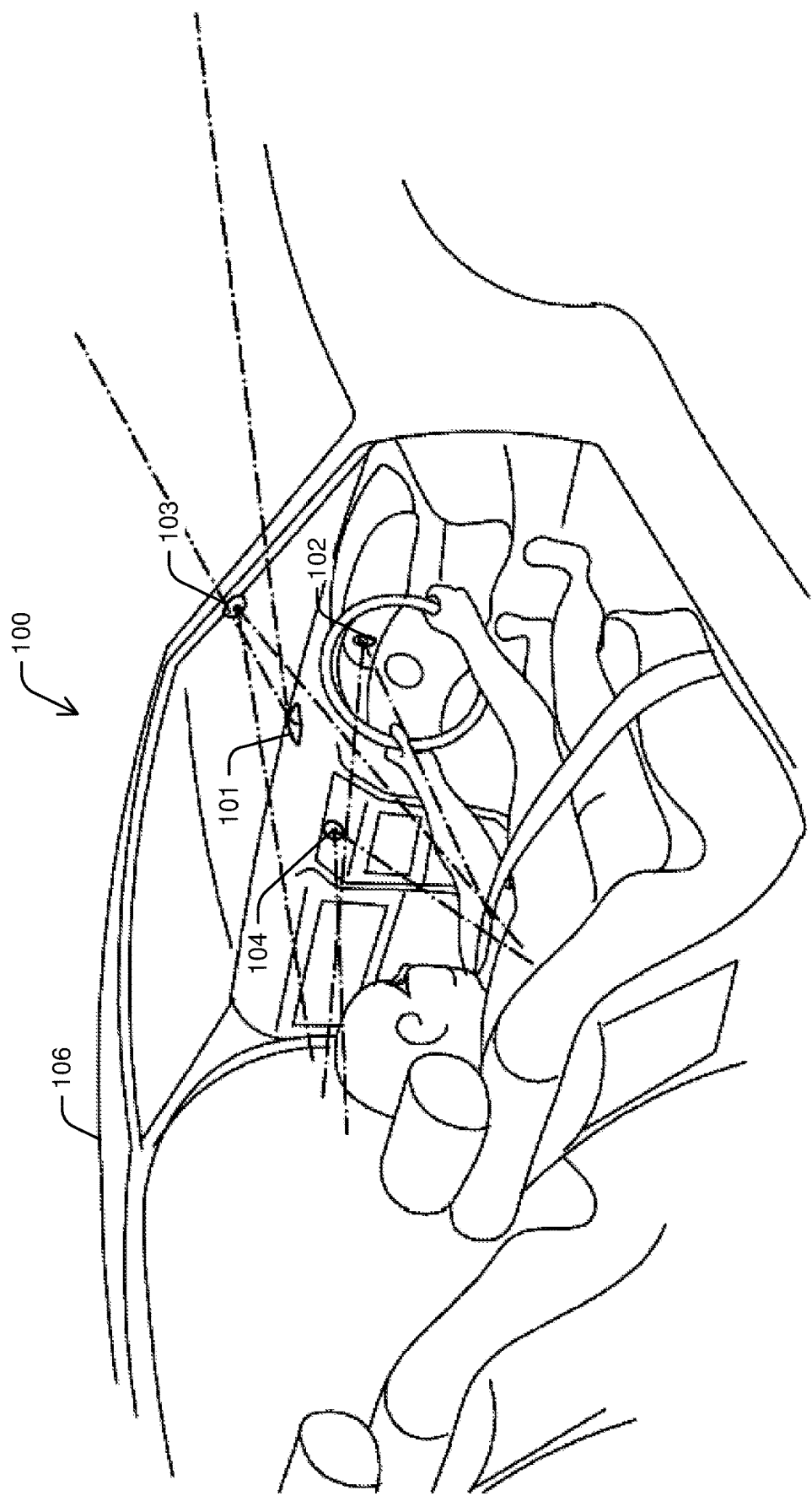
FIG. 1 is a perspective view of a four camera monitoring system positioned within a vehicle.
Figure 2:
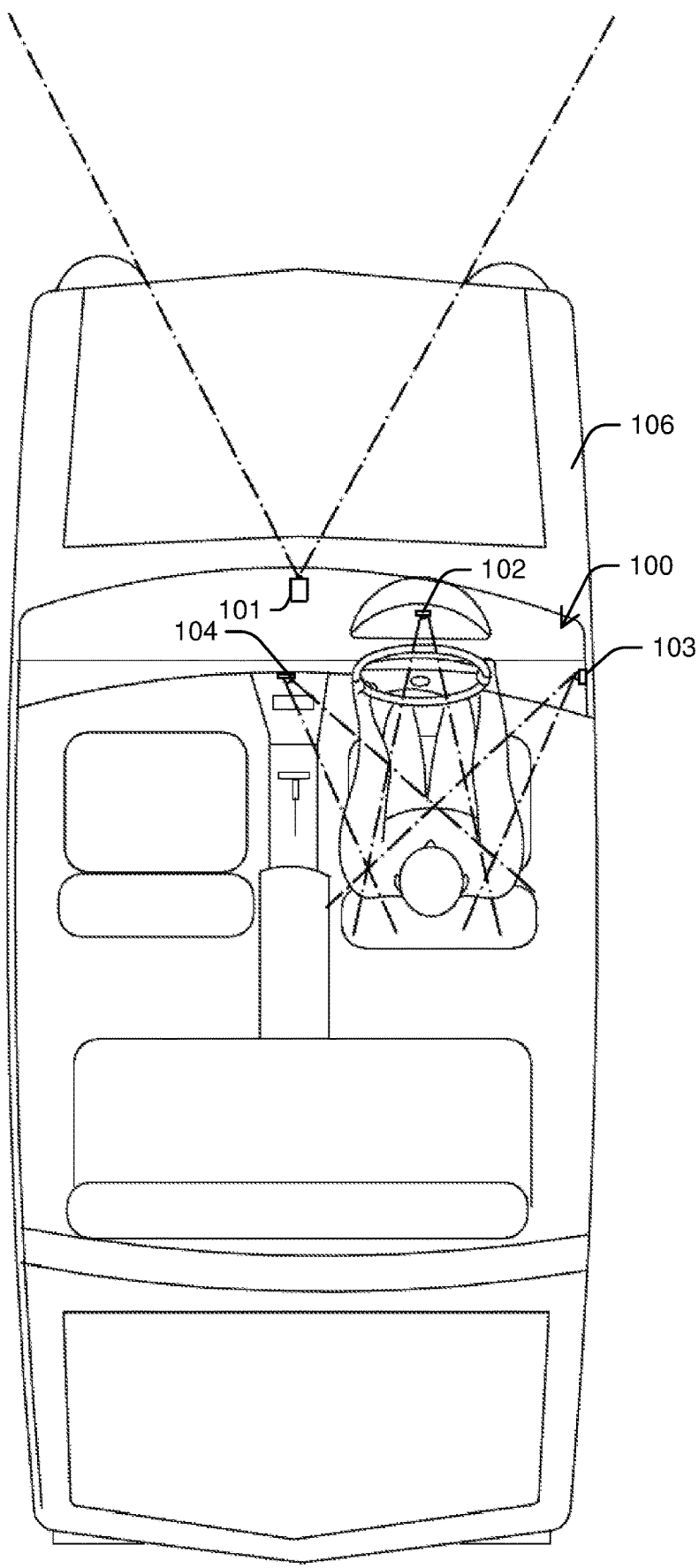
FIG. 2 is a plan view of the four camera monitoring system of FIG. 1.

Referring initially to FIGS. 1 and 2, there is illustrated a vehicle monitoring system 100 including four cameras 101-104 disposed at different locations within a vehicle 106. Camera 101 is positioned on a dashboard of the vehicle and oriented in a forward direction of the vehicle for monitoring the forward road scene. Cameras 102, 103 and 104 are positioned and oriented to monitor a driver 108 of vehicle 106. Camera 102 is positioned on or adjacent an instrument panel of vehicle 106 or on the steering column of vehicle 106. Camera 103 is positioned on the driver side A-pillar of the frame of vehicle 106. Camera 104 is positioned on or adjacent a center console of vehicle 106, preferably adjacent a display screen in vehicles where such a screen is provided. The specific camera locations are exemplary only and it will be appreciated that more or less cameras can be incorporated at other locations within or outside vehicle 106 to monitor the driver, the forward road scene or other views in or around the vehicle. Other exemplary locations of cameras include a rearview mirror, rear bumper, front bumper, vehicle roof and bonnet/hood.

Figure 3:
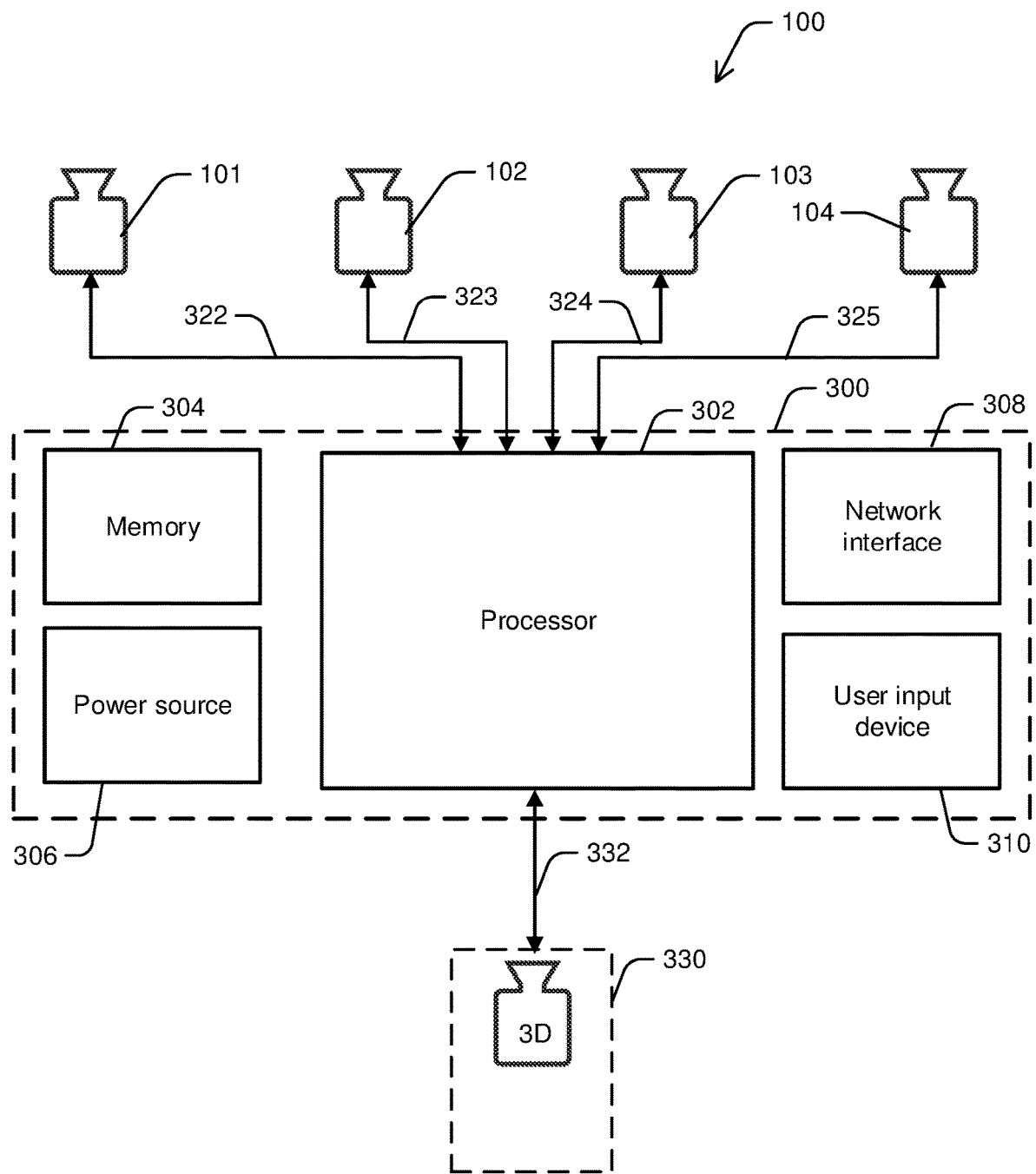
FIG. 3 is a schematic system level diagram of the four camera monitoring system of FIGS. 1 and 2.

Referring now to FIG. 3, there is illustrated a system level diagram of system 100. System 100 includes a central processing unit 300 including a processor 302, memory 304, a power source 306, a network interface 308 and a user input device 310. In the embodiments of a vehicle monitoring system, central processing unit 300 is preferably mounted within the vehicle dash or center console and can be integrated with an onboard vehicle computer system during manufacture. However, central processing unit 300 and system 100 as a whole may be manufactured as an aftermarket product and subsequently installed into vehicle in a modular manner.

Processor 302 may represent any known or conventional microprocessor or personal computer having hardware and/or software configured for processing image streams received from multiple cameras. By way of example, processor 302 may include system-on-chip technology and include a video processing pipeline. In one embodiment, processor 302 may be integral with or in communication with a processor of an onboard vehicle computer system.

Central processing unit 300 is powered by connection to a power source 306. In one embodiment, power source 306 represents an electrical connection to a vehicle power source such as the vehicle battery. In another embodiment, power source 306 represents a local battery integrated within a housing of central processing unit 300 and optionally connected to an external power source.

Network interface 308 provides for communicating data to and from system 100 and represents an electrical or wireless interface for connecting system 100 to other devices or systems. Network interface 308 includes wired network ports such as USB, HDMI or Ethernet ports, serial device ports and/or wireless devices such as a Bluetooth™ device, Wi-Fi™ device or cellular network transceiver.

User input is able to be provided to system 100 through user input device 310, which can include a touchscreen display or a keyboard or keypad and associated display. User input device 310 may also represent external devices such as computers or smartphones connected to system 100 through network interface 308 or other means. In one embodiment, user input device 310 represents a computer system integrated into the vehicle and manipulated through a display interface mounted in the vehicle's center console.

Example data that can be input to system 100 through user input device 310 includes:

Vehicle scene reference data including a three dimensional model of the vehicle cabin or two dimensional image of the vehicle scene;

Initial or reference position and orientation data for cameras 101-104;

Positions of other reference points in the vehicle;

Driver images for facial recognition;

Model data of the vehicle or vehicle cabin;

Driver details such as driver height for determining eye positions within the vehicle; and Software updates for processor 302 such as updated gaze tracking algorithms.

Example data that can be extracted from system 100 through user input device 301 includes:

Statistical gaze direction data;

Camera calibration or realignment data; and

Raw or processed image/video data from cameras 101-104.

System 100 includes four camera units 312-315, which are mounted at relative locations within or about the scene to be monitored. Each camera unit 312-315 includes a respective camera 101-104 for capturing images of the scene within its respective field of view.

Each camera is electrically connected to central processing unit 300 through respective connections 322-325 including electrical cables and associated electrical ports. The electrical connections provide for control of cameras 101-104 by processor 302 and transmission of image data from cameras 101-104.

Cameras 101-104 may utilize various types of known image sensors in combination with imaging optics. Example image sensors include charge-coupled devices (CCDs) or complementary metal-oxide-semiconductor (CMOS) chips combined with relevant processing electronics and memory to capture images and/or video sequences in suitable formats for subsequent image processing. Cameras 101-104 may be capable of capturing images in two or three dimensions.

In the case of a vehicle scene, the frame of reference may be defined relative to a region of the vehicle frame. By way of example, a reference coordinate system may be defined as having a z-axis aligned along the vehicle drive shaft (longitudinal dimension), an x-axis aligned along the front wheel axle (defining a transverse dimension) with the right wheel being in the positive direction and a y-axis defining a generally vertical dimension to complete the orthogonal coordinate system. This exemplary coordinate system will be used herein to describe the disclosure. However, it will be appreciated that other arbitrary reference coordinate systems may be chosen.

Finally, system 100 includes a depth imaging device 330 for capturing images of the scene, including each camera 101-104 in three dimensions. Depth imaging device 330 can include one or more of a scanning or pulsed time of flight camera, LiDAR system, stereoscopic camera arrangement, structured light 3D scanner, image sensor with phase detection or any other imaging system capable of capturing images of a scene in three dimensions. Depth imaging device 330 is operatively associated with processor 302 through electrical connection 332 to provide control to device 330 and receive raw three dimensional image data or pre-processed depth map data from device 330. In some embodiments depth imaging device 330 is connected to central processing unit 300 and processor 302 through network interface 308.

Figure 4:
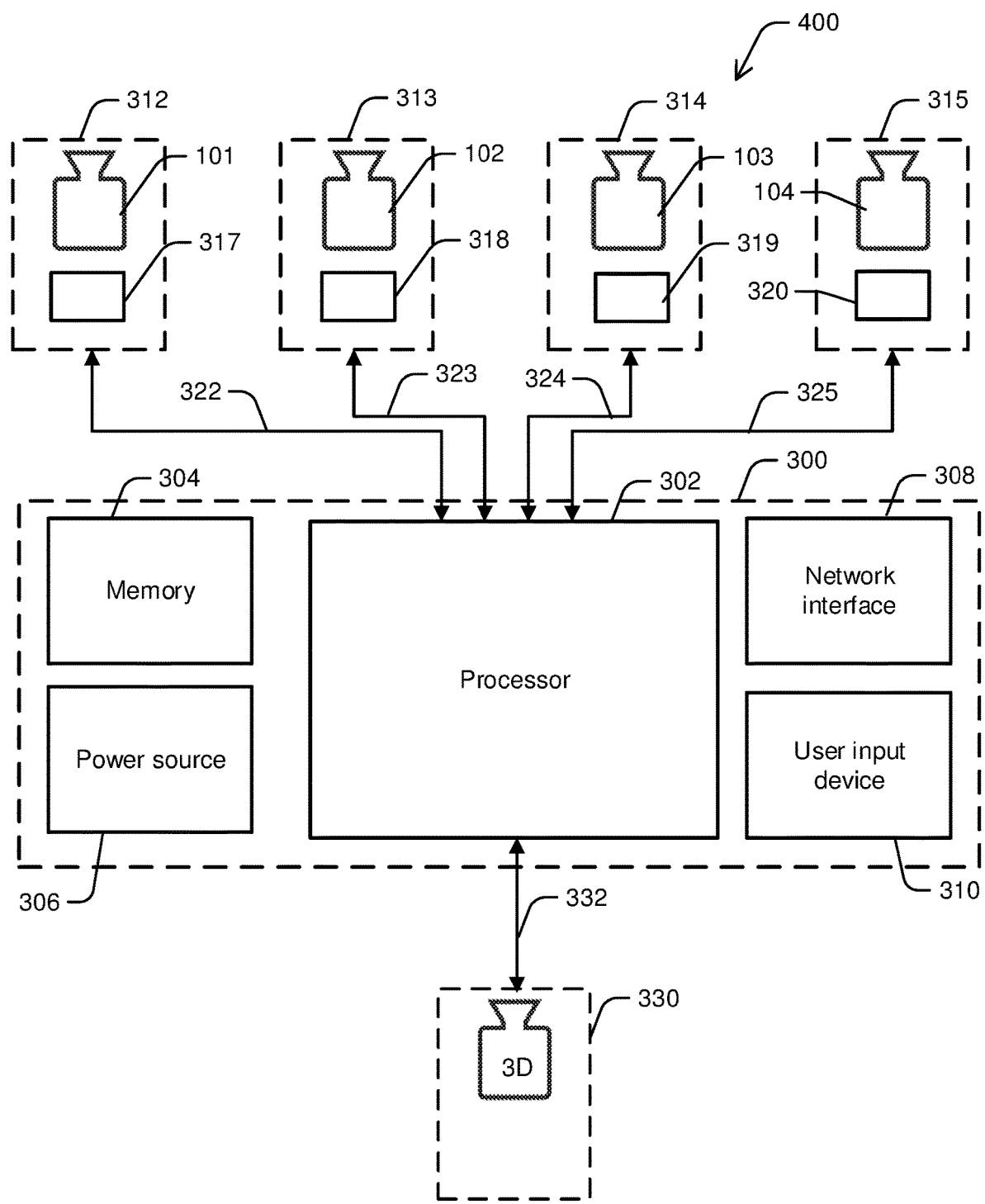
FIG. 4 is a schematic system level diagram of an alternative four camera monitoring system.

An alternative embodiment system 400 is illustrated in FIG. 4. Here corresponding features of system 100 are designated with the same reference numerals. System 400 includes four camera units 312-315, which each include a respective camera 101-104 and an orientation sensor 317-320 for measuring the orientation of the camera relative to a reference orientation.

Orientation sensors 317-320 may include simple inertial devices such as accelerometers and gyroscopes and other devices such as magnetometers and more advanced inertial measurement units, or combinations thereof. Orientation sensors 317-320 may be capable of measuring orientation in one, two or three dimensions relative to a reference orientation. A suitable reference orientation is that described above using the vehicle drive shaft and front wheel axle. However, it will be appreciated that a reference orientation can be chosen arbitrarily based on the particular application. For example, if two or more cameras were aligned along a common axis, that axis may be preferred as the reference orientation. The orientations are preferably expressed in a three dimensional Cartesian coordinate system. However, it will be appreciated that the orientations can be expressed in any arbitrary coordinate system such as a spherical coordinate system wherein an orientation vector is expressed in terms of a radial distance (r), a zenith angle ($\theta$) in a vertical plane and an azimuthal angle ($\phi$) in a horizontal plane.

In one embodiment, the orientation sensors 317-320 are mounted integrally on respective cameras 101-104. In another embodiment, orientation sensors 317-320 are mounted relative to each camera 101-104 on an intermediate support frame on which the camera is also mounted.

Exemplary Implementation

Figure 5:
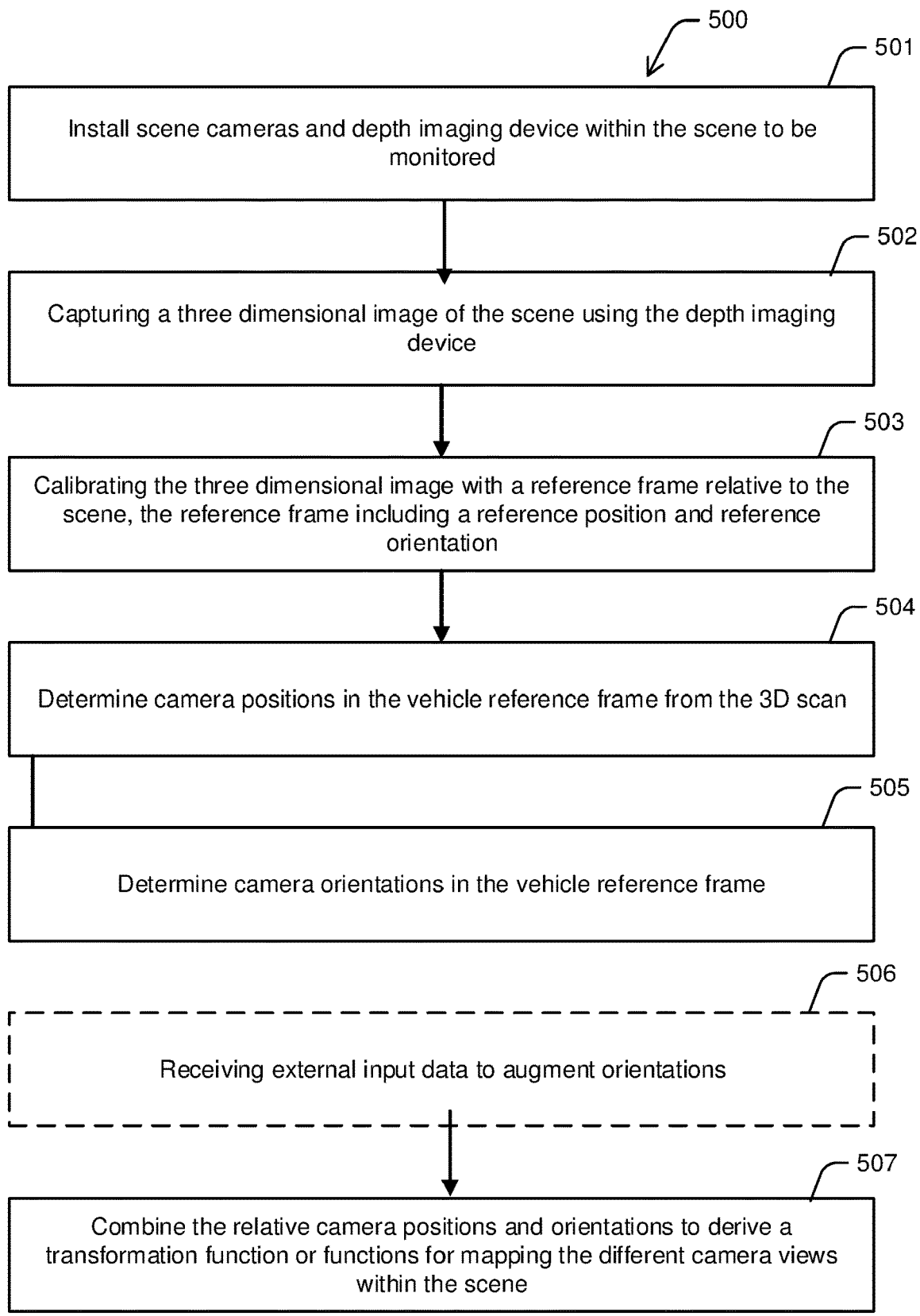
FIG. 5 is a functional flow diagram illustrating the primary stages in a method of registering the position and orientation of a plurality of cameras in a multi-camera imaging system.

The operation of systems 100 and 400 for registering the position and orientation of a plurality of cameras in a multi-camera imaging system will be described with reference to method 500 illustrated in the flow chart of FIG. 5.

Initially, at stage 501 the cameras are installed in their desired locations within the scene to be monitored. In the case of a driver monitoring system, the cameras are preferably mounted at locations in or around the vehicle such as those in FIGS. 1 and 2 so as to position the driver and the forward road scene squarely within their respective fields of view. Stage 501 may be performed during manufacture of the vehicle or during a subsequent installation of system 100 in vehicle 106.

During the installation of the camera units 312-315, each unit is electrically connected to central processing unit 300 through respective connections 322-325. During stage 501, depth imaging device 330 is also installed and connected to system 100 through electrical connection 332. Depth imaging device 330 may be installed in a temporary or permanent manner within or adjacent vehicle 106.

Device 330 is installed with an accurately known camera pose relative to a fixed vehicle frame of reference defined in the next stage. The camera pose includes a six dimensional vector indicating the three dimensional position of the camera sensor array and three dimensional orientation of an optical axis of the camera.

At stage 502, depth imaging device 330 is controlled to generate one or more three dimensional images of the scene, which includes camera units 312-315. The three dimensional images represent depth maps of the scene including two dimensional transverse positions of objects plus a third dimension indicating the depth of objects from the depth imaging device 330.

Prior to extracting accurate depth data, depth imaging device 330 will typically require a calibration. Some commercial devices such as time of flight cameras have inbuilt calibration routines which allow for self-calibration. However, other devices will require manual calibration by, for example, placing a calibration object in the scene which has dimensions known to a high degree of accuracy.

In the case where depth imaging device 330 includes a stereoscopic camera system, the two cameras first need to be calibrated by determining the relative position and orientation of the cameras relative to each other or a reference point to compute the ray intersection point for associated pixels of the cameras. Furthermore, there is a need to identify where each surface point that is visible in one stereo image is located in the other stereo image. The cameras must also be positioned so as to be capturing overlapping fields of view. Calibration of the scene can be initially performed by placing an object having a predefined calibration pattern in the scene to be imaged. Upon capturing stereo images, the calibration pattern can be used to identify corresponding pixels of the cameras and also to identify other parameters of the simulated 3D scene, such as the rotation and shift in three dimensions between the cameras, focal lengths, distortion etc. Using these parameters, the three dimensional coordinates of objects can be calculated within the scene.

The three dimensional image captured at stage 502 is in the frame of reference of the depth imaging device 330. At stage 503, the three dimensional image is calibrated to a reference frame within or relative to the vehicle scene to determine the pose of device 330 in the reference frame. The reference frame includes a reference position and reference orientation. A suitable reference frame is that described above using the vehicle drive shaft and front wheel axle. This reference frame will be referred to as the vehicle reference frame. Here reference position will be the intersection of the front vehicle axle and the drive shaft. The reference orientation may be designated as the forward direction of the vehicle defined along the longitudinal axis.

Other example reference positions include the three dimensional position of depth imaging device 330 or the three dimensional position of one of camera units 312-315. However, the reference position can be chosen arbitrarily as long as it can be identified in the three dimensional images and accurately related to positions of the camera units 312-315. By way of example, the reference position can be designated as a known point of reference within the scene such as a point on the center console of the vehicle. The reference position and orientation may be designated by a user through user input device 310.

Figure 6:
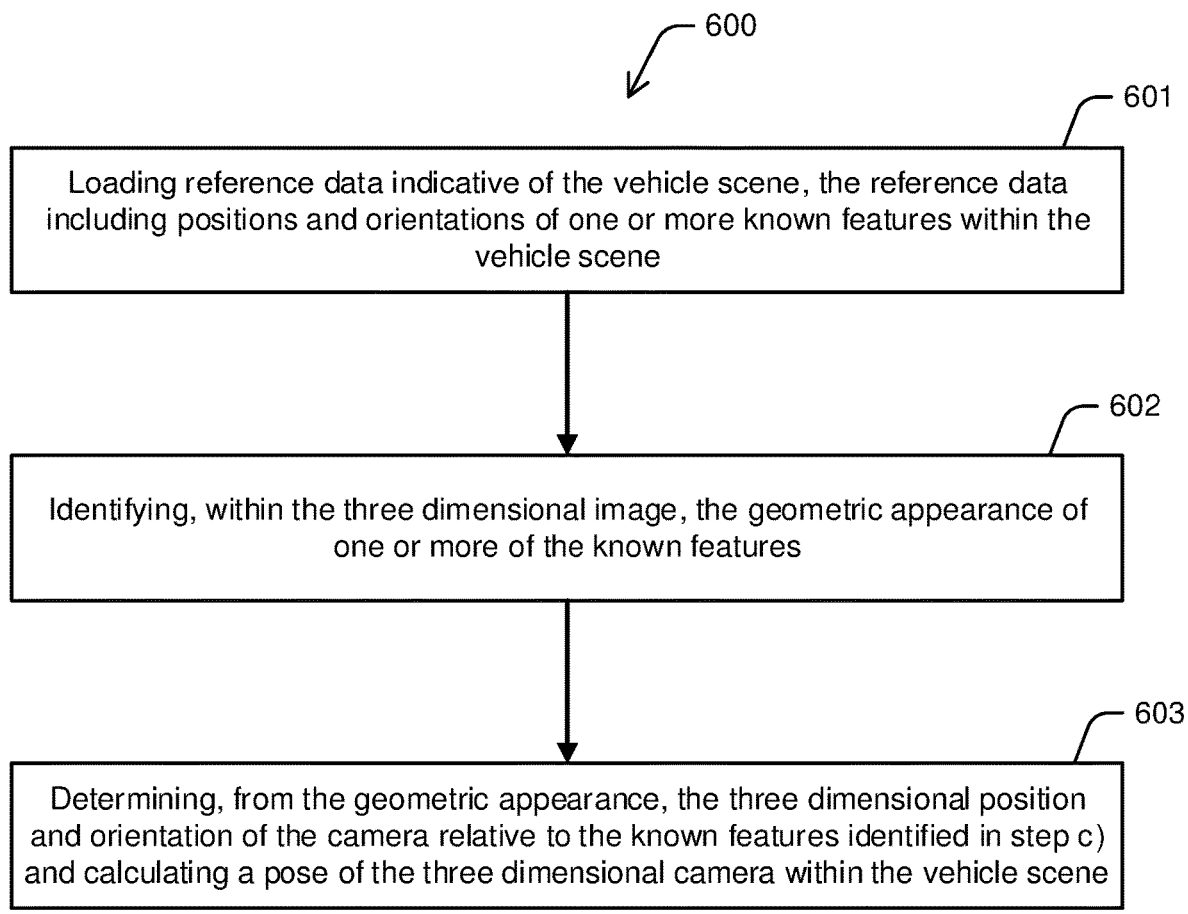
FIG. 6 is a functional flow diagram illustrating the primary stages in a method of calibrating a three dimensional image within a vehicle scene.

In some embodiments, stage 503 may be performed manually by designating the position and orientation of device 330 through user input device 310. In other embodiments, stage 503 is performed through a self-calibration process 600 illustrated in FIG. 6 and described as follows. Initially, at stage 601, reference data indicative of the vehicle scene is loaded from memory 304. The reference data includes positions and orientations of one or more known features within the vehicle scene. The reference data may represent a three dimensional CAD model of the vehicle scene or cabin. Alternatively, the reference data may represent an image captured by device 330 at an earlier time and at an accurately known camera pose. The known features may include features, objects, contours or surfaces within the vehicle scene such as dashboard instruments. The vehicle cabin itself may represent a known object if an accurate model of the cabin is known. The known objects must have a geometric appearance that is known within the scene.

Next, at stage 602, the geometric appearance of one or more of the known features is identified within the three dimensional image. This may occur through pattern matching, shape recognition or the like. Finally, at stage 603, the three dimensional position and orientation of the camera relative to the known features is determined from the geometric appearance. From this, a pose of the three dimensional camera within the vehicle scene can be determined. The final stage can leverage use of a machine learning technique such as a convolutional neural network to learn the vehicle cabin and the features within it under different conditions. For example, when the driver is seated in the vehicle and occluding some of the known objects.

Returning to FIG. 5, at stage 504, a three dimensional position of each of cameras 101-104 within the three dimensional image(s) in the reference frame is determined. In one embodiment, identifying the three dimensional position of the cameras within the scene includes manually designating the camera positions using a software application. In this technique, the three dimensional image is displayed on a display screen and a user is able to control a cursor through user input device 310 such as a mouse, keyboard, touchscreen or other similar device to manually designate the cameras using a select and click process. The selected positions are stored in memory 304 in a coordinate system defined with reference to the reference position.

In another embodiment, stage 504 includes performing shape recognition on the three dimensional image to automatically recognize the position of cameras 101-104 in the image. If cameras 101-104 have a predefined and recognizable shape, a shape recognition algorithm may be performed by processor 302 to automatically recognize the two dimensional transverse position of each camera within the three dimensional image and subsequently extract the corresponding depth values of the cameras at those two transverse positions. If the resolution of the scene image is sufficiently high, a center of the camera aperture can be identified and designated as the camera position. As the cameras will generally comprise a region of pixels within the image, the depth of each camera can be calculated as an aggregate or average depth, or by a depth of a particular portion of the cameras.

As there is also a need to distinguish the cameras from one another, the automatic shape recognition algorithm described above may be used in conjunction with user input by user input device 310.

In a further embodiment, each camera is designated with a predefined pattern prior to imaging and a shape recognition algorithm is performed which recognizes the predefined patterns to locate and distinguish each camera. Example patterns include a simple numerical identifier ('1', '2', '3' . . . ), a two or three dimensional barcode or other unique pattern. The patterns may be adhered to each camera using an adhesive material or may be scribed into a face of each camera. Preferably the pattern is located on a central region of the camera body so as to accurately represent the position of the camera image sensor. Further, the patterns may be printed on multiple faces of each camera to increase the chances of an accurate location in the image from different angles.

At stage 505, an orientation of each camera is determined in the vehicle frame of reference. In one embodiment utilizing system 400 described above, this includes obtaining orientation data of each camera from respective orientation sensors 317-320 through signals 322-325. Preferably the orientation data includes a camera orientation in two or three dimensions. However, the orientation sensors may only provide orientation in one dimension and the remaining dimensions can be measured manually. The orientations are defined relative to the reference orientation described above. When utilizing orientation sensors to obtain the orientation of the cameras, stage 505 can be performed in conjunction with stages 503 and 504, or performed before or after stages 503 and 504.

In an alternative embodiment, the orientation of cameras 101-104 can be determined through a self-calibration process similar to process 600 described above in relation to depth imaging device 330. Here the scene camera under test is used to capture an image from its current pose and stages 601-603 are performed using the captured image. Essentially the captured image is compared to a three dimensional model of the scene (or an earlier captured image at a known camera pose) and pattern matching and/or machine learning is used to determine the orientation of the camera within the scene in the vehicle reference frame. This process can be performed for each camera and can also be used to capture camera position or as a check for the accuracy of the above measurement in stage 504. Thus, this process could be used to perform both stages 504 and 505.

At optional stage 506, processor 302 receives external input such as velocity or acceleration data of the vehicle, or a GPS position of the vehicle. By way of example, system 100 may be connected to an onboard vehicle computer system through network interface 308 which provides a feed of vehicle data such as vehicle GPS position, velocity and acceleration. The external input data can be used to augment the orientation data to aid in the calculation of camera orientations, particularly when the orientation sensor is only capable of measuring orientation in one or two dimensions. By way of example, yaw orientation (in the vertical axis) is typically difficult to determine when the camera is stationary under the constant force of gravity. Measuring a change in position, velocity or acceleration of the camera as the vehicle is in motion can help to determine an overall force vector from which the orientation of the camera in three dimensions can be extrapolated.

The external input can also be fed to a machine learning algorithm as additional inputs for the determination of camera positions in stages 504 and 505.

Finally, at stage 507, processor 302 combines the three dimensional position, orientation and optionally the external input data for each camera to determine a camera pose.

The camera pose can be used to identify and track objects within the scene across different cameras. In one embodiment, a driver's gaze point (point of regard) can be deduced from a driver facing camera and projected onto images of a forward facing camera capturing the forward road scene.

It will be appreciated that the system and method described above provides for efficiently and accurately determining relative positions and orientations of cameras in a multi-camera system.

Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several stages, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described for the sake of clarity. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, embodiments of the present disclosure may take the form of a method, an entirely hardware embodiment, an entirely software embodiment or an embodiment combining software and hardware embodiments. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the stages of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or stages listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Figure, or description thereof for the purpose of streamlining the disclosure and aiding in the understanding of one or more of the various embodiments. This method of disclosure, however, is not to be interpreted as reflecting an intention that the claims require more features than are expressly recited in each claim. Rather, as the following claims reflect, embodiments may include less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while various embodiments have been described, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Stages may be added or deleted to methods described within the scope of the present disclosure.

We claim:

1. A processor implemented method of determining a position and an orientation of one or more cameras in a camera imaging system located within a vehicle, the method comprising:
   a) receiving, from a depth imaging device, a three dimensional image of a scene including one or more cameras located in the scene, the scene including an interior of a cabin or a cockpit of the vehicle
   b) calibrating, by the processor, the three dimensional image with a reference frame relative to the scene, the reference frame including a reference position and a reference orientation relative to the vehicle
   c) determining a three dimensional position of each of the one or more cameras within the three dimensional image in the reference frame by manual or automatic determination of the geometric appearance of the one or more cameras in the three dimensional image;
   d) determining an orientation of each of the one or more cameras in the reference frame; and
   e) combining the position and orientation of each of the one or more cameras to determine a camera pose for each of the one or more cameras in the reference frame.

2. The method according to claim 1, wherein stage d) includes obtaining orientation data from orientation sensors mounted on the one or more cameras.

3. The method according to claim 2, wherein each orientation sensor includes a magnetometer.

4. The method according to claim 2, wherein each orientation sensor includes an inertial measurement device.

5. The method according to claim 1, wherein the depth imaging device includes one or more of a time of flight camera, a structured light 3D scanner, a stereo camera system, a depth camera, a laser scanner or a LiDAR system.

6. The method according to claim 1, wherein the scene includes portions of a vehicle and the reference orientation is defined relative to a vehicle axle or a vehicle drive shaft.

7. The method according to claim 1, further comprising receiving velocity or acceleration data of the scene.

8. The method according to claim 1, further comprising receiving GPS data for a predefined position within the scene.

9. The method according to claim 1, wherein determining the three dimensional position of the one or more cameras within the scene includes performing shape recognition on the three dimensional image to automatically recognize the three dimensional position of the one or more cameras in the image.

10. The method according to claim 9, wherein performing shape recognition determines a shape of the one or more cameras.

11. The method according to claim 9, wherein the shape recognition is adapted to recognize predefined patterns disposed on or adjacent to each of the one or more cameras.

12. The method according to claim 1, wherein identifying the three dimensional position of the one or more cameras within the scene includes manually designating the camera three dimensional positions in the three dimensional image using a software application.

13. The method according to claim 1, wherein the reference position is a three dimensional position of one of the one or more cameras.

14. The method according to claim 1, wherein the reference position is a three dimensional position of a known feature within the scene.

15. The method according to claim 1, wherein determining the three dimensional position of each of the one or more cameras within the scene includes calibrating a scene geometry with a known reference feature.

16. The method according to claim 1, further comprising:
   f) Identifying and removing the depth imaging device from the scene.

17. The method according to claim 1, wherein stage b) includes:
   i. identifying, within the three dimensional image, a geometric appearance of one or more known features based on reference data indicative of the vehicle scene, the reference data including positions and orientations of the one or more known features within the vehicle scene;
   ii. determining, from the geometric appearance, the three dimensional position and orientation of the one or more cameras relative to the known features identified in b) i and determining a camera pose for each of the one or more cameras in the reference frame.

18. A system configured to determine a position and an orientation of one or more cameras in a camera imaging system, each of the cameras being mounted within a vehicle, the system including:
   a depth imaging device configured to obtain a three dimensional image of the scene including the one or more cameras located within the scene, the scene including an interior of a cabin or cockpit of the vehicle; and
   a processor circuit configured to perform operations including:
      calibrating the three dimensional image with a reference frame relative to the scene,
      the reference frame including a reference position and a reference orientation relative to the vehicle
      determining the three dimensional position of each of the one or more cameras within the three dimensional image relative to the reference frame by manual or automatic determination of the geometric appearance of the one or more cameras in the three dimensional image;
      determining the orientation of each of the one or more cameras in the reference frame; and
      combining the position and orientation of each of the one or more cameras to determine a camera pose for each of the one or more cameras relative to the reference frame.

19. The system according to claim 18, including one or more orientation sensors, each being mounted on an associated camera and configured to measure orientation data indicative of the orientation of the associated camera.

* * * * *